United States Patent [19]

Murphy et al.

[11] Patent Number: 5,301,001

[45] Date of Patent: Apr. 5, 1994

[54] EXTRINSIC FIBER OPTIC DISPLACEMENT SENSORS AND DISPLACEMENT SENSING SYSTEMS

[75] Inventors: Kent A. Murphy, Roanoke; Michael F. Gunther, Blacksburg, both of Va.; Ashish M. Vengsarkar, Scotch Plains, N.J.; Richard O. Claus, Christiansburg, Va.

[73] Assignee: Center For Innovative Technology, Herndon, Va.

[21] Appl. No.: 834,674

[22] Filed: Feb. 12, 1992

[51] Int. Cl.$^5$ ............................................. G01B 9/02
[52] U.S. Cl. ............................ 356/35.5; 356/345; 356/349; 250/227.27
[58] Field of Search ............... 356/345, 357, 358, 359, 356/43, 44, 35.5, 349; 250/227.19, 227.27; 73/800; 374/130, 131

[56] References Cited

U.S. PATENT DOCUMENTS

| | | | |
|---|---|---|---|
| 4,868,381 | 9/1989 | Davis | 356/345 |
| 4,918,492 | 4/1990 | Ferdinand et al. | 356/345 |
| 5,073,004 | 12/1991 | Clayton et al. | 356/352 |

Primary Examiner—Samuel A. Turner
Assistant Examiner—Robert Kim
Attorney, Agent, or Firm—Whitham & Marhoefer

[57] ABSTRACT

An extrinsic Fizeau fiber optic sensor comprises a single-mode fiber, used as an input/output fiber, and a multimode fiber, used purely as a reflector, to form an air gap within a silica tube that acts as a Fizeau cavity. The Fresnel reflection from the glass/air interface at the front of the air gap (reference reflection) and the reflection from the air/glass interface at the far end of the air gap (sensing reflection) interfere in the input/output fiber. The two fibers are allowed to move in the silica tube, and changes in the air gap length cause changes in the phase difference between the reference reflection and the sensing reflection. This phase difference is observed as changes in intensity of the light monitored at the output arm of a fused biconical tapered coupler. The extrinsic Fizeau fiber optic sensor behaves identically whether it is surface mounted or embedded, which is unique to the extrinsic sensor in contrast to intrinsic Fabry-Perot sensors. The sensor may be modified to provide a quadrature phase shift extrinsic Fizeau fiber optic sensor for the detection of both the amplitude and the relative polarity of dynamically varying strain. The quadrature light signals may be generated by either mechanical or optical means. A plurality of the extrinsic sensors may connected in cascade and multiplexed to allow monitoring by a single analyzer.

13 Claims, 12 Drawing Sheets

EXTRINSIC FIBER OPTIC DISPLACEMENT SENSORS AND DISPLACEMENT SENSING SYSTEMS

STATEMENT OF GOVERNMENT INTEREST

This invention was made with government support under Contract DE-AC21-89MC25159 awarded by the Department of Energy. The government has certain rights in this invention.

BACKGROUND OF THE INVENTION

1. Field of the Invention

The present invention generally relates to fiber optic interferometric sensors and, more particularly, to extrinsic Fizeau interferometric fiber optic sensors having particular application in hostile environments for dynamic monitoring of strain, temperature or pressure in mechanical structures. The extrinsic fiber optic sensors according to the invention are capable of both relative and absolute measurement of strains and, with suitable modification, can be used for the detection of the relative polarity of dynamically varying strain, temperature or pressure. As used herein, the word "strain" will be understood to mean strain, temperature, pressure, magnetic fields (i.e., magnetostrictive materials), and other like phenomena that can be translated into a displacement depending on the specific application.

2. Description of the Prior Art

Fiber optic Fabry-Perot sensors reported in the literature have been highly sensitive to temperature, mechanical vibration, acoustic waves and magnetic fields. See T. Yoshino, K. Kurosawa, K. Itoh, and T. Ose, *IEEE J. Quantum Electron.*, QE-18, 1624 (1982). Techniques to create the Fabry-Perot cavity have varied from the creation of Bragg gratings in or on the fiber, as described by K. L. Belsley, J. B. Carroll, L. A. Hess, D. R. Huber, And D. Schmadel, in *Proc. Soc. Photo-Opt. Instrum.*, Eng. 566, 257 (1985), to the use of air-glass interfaces at the fiber ends as the reflectors, as described by A. D. Kersey, D. A. Jackson, and M. Corke, in *Opt. Comm.*, 45, 71 (1983). A relatively new technique described by C. E. Lee and H. F. Taylor, in *Electron. Lett.*, 24, 193 (1988), involves fabricating semireflective splices in a continuous length of fiber.

Applied strain at high temperature for intrinsic optical fiber sensors can cause plastic deformation (i.e., creep), making such sensors unsuitable to many hostile environments. The intrinsic Fabry-Perot interferometer described by Lee and Taylor, ibid., exhibits stress-induced birefringence in the air gap which causes polarization changes between the reference and the sensing reflections. This, in turn, causes signal fading observed as a decrease in fringe contrast. Extremely high magnetic fields can also cause polarization changes inside an optical fiber which again would cause a changing state of polarization between the reference and sensing reflections in an intrinsic Fabry-Perot interferometric sensor.

Most Fabry-Perot sensor described in the prior art have been useful in the measurement of quasi-static strain alone. That is, when the induced strain changes its polarity, the Fabry-Perot interferometers would not be able to detect this change if the switch in direction took place at a maximum or minimum of the transfer function curve. Methods for obtaining directional strain information by using thin-film or resistive gauges have been reported by J. Putz, J. Putz, a. Wicks, and T. Diller, in "Thin-film shear stress gauge", presented at the American Society of Mechanical Engineers Winter Annual Meeting, Dallas, Tex., Nov. 26, 1990; however, no corresponding capability has been demonstrated in Fabry-Perot optical fiber sensors in the prior art.

SUMMARY OF THE INVENTION

It is therefore an object of the present invention to provide an fiber optic sensor which can be manufactured in micro-miniature form and capable of withstanding extreme and hostile environments.

It is another object of the invention to provide an improved fiber optic sensor which is immune to stress-induced, magnetic field or thermal effects and other undesirable perturbations.

It is yet another object of the invention to provide an extrinsic optical sensor which may be either surface mounted on or embedded in a mechanical structure to be monitored.

It is a further object of the invention to provide an optical fiber sensor capable of dynamically detecting strain and providing unambiguous information on the direction of strain.

While the prior art sensors described above can be classified as intrinsic sensors whereby the fiber itself plays a role in the sensing mechanism, the sensor according to the invention is extrinsic in the sense that the fiber acts as a conduit for optical power transmission to and from the sensing element. In this sense, the invention is significantly different from the prior art. The advantages are that low coherence sources, with correspondingly low costs, can be used. Also, the fabrication process is much simpler than earlier Fabry-Perot sensors. Another advantage is that stable operation of the sensor with use of two wavelengths of light can be implemented. Instability due to extraneous thermal drifts is a typical problem in highly-sensitive phase-modulated fiber optic sensors.

More specifically, the subject invention is directed to extrinsic Fizeau interferometric fiber optic sensors, as contrasted to intrinsic Fabry-Perot interferometric fiber optic sensors known in the prior art. Fabry-Perot interferometers are characterized by multiple reflections within the cavity. The Fizeau interferometer operates on the principle of a single reflection within the cavity. The principles of the Fizeau interferometer are applied to a new fiber optic sensor to provide an extrinsic sensor which is not subject to the problems associated with the prior art intrinsic Fabry-Perot interferometric fiber optic sensors.

According to a preferred embodiment of the invention, the extrinsic Fizeau interferometer comprises a single-mode fiber, used as an input/output fiber, and a multimode fiber, used purely as a reflector, to form an air gap within a silica tube that acts as a Fizeau cavity. The far end of the multimode fiber is shattered so the reflections from the far end do not add to the detector noise. The Fresnel reflection from the glass/air interface at the front of the air gap (reference reflection) and the reflection from the air/glass interface at the far end of the air gap (sensing reflection) interfere in the input/output fiber. Although multiple reflections occur within the air gap, the effect of reflections subsequent to the ones mentioned above can be shown to be negligible. The two fibers are allowed to move in the silica tube, and changes in the air gap length cause changes in the phase difference between the reference reflection and the sensing reflection. This phase difference is observed as changes in intensity of the light monitored at the output arm of a fused biconical tapered coupler.

The extrinsic Fizeau fiber optic sensor behaves identically whether it is surface mounted or embedded, which is unique to the extrinsic sensor in contrast to the intrinsic sensors of the prior art. See "Phase-Strain-Temperature Model for Structurally Embedded Interferometric Optical Fiber Strain Sensors with Applications" by Jim Sirkis, SPIE, vol. 1588, Fiber Optic Smart Structures and Skins IV (1991). The extrinsic Fizeau optic fiber sensor according to the invention has been implemented for temperature measurement at temperatures from ~276° C. to 1000° C. The extrinsic Fizeau fiber optic sensor according to the invention can be applied to a structure to be monitored by attaching or embedding the single mode fiber at a single point such that no strain is transferred to the fiber which avoids the possibility of plastic deformation when combining strain and high temperature. Since the sensor utilizes the air gap as the sensing mechanism, and not the fiber itself as with intrinsic optical fiber sensors, there are no strain-optic or thermo-optic effects for the extrinsic Fizeau interferometer sensor. Therefore, the sensing reflection signal travels across the air gap and is unaffected by high magnetic fields, temperature changes, or other environmental conditions.

Immunity to polarization changes are another advantage of the extrinsic Fizeau sensor over the intrinsic Fabry-Perot sensors of the prior art. Any changes in polarization, due for example to stress-induced birefringence or extremely high magnetic fields, take place before the reference reflection in the extrinsic Fizeau interferometer optic fiber sensor.

The basic extrinsic Fizeau fiber optic sensor according to the invention may be modified to provide two signals 90° out of phase with respect to each other. The phase shifted signals can be achieved by both mechanical and optical means. More specifically, for mechanically obtained quadrature phase shifted signals, two single-mode fibers are inserted into one hollow silica tube and the gap-separations for the two fibers are adjusted actively by moving the fibers in and out of the tube until a 90° phase shift is achieved at the output. In a further variation, two different silica tubes may be used. Since the two tubes have external diameters on the order of a few hundred micrometers, the two sensors monitor almost the same environmental perturbations. In one embodiment employing an optical means of obtaining quadrature phase shifted signals, two different sources are used in order to avoid interference effects between the two signals returning to the coupler if only one source was used to launch light into the single-mode fibers. In another embodiment, a single source used with two different lengths of lead fibers for the two sensors such that the difference in the lengths is greater than the coherence length of the laser. Alternatively, the quadrature phase shift may be approximated by using two laser sources of different wavelengths. The dual wavelengths necessary for quadrature phase shifting also can be obtained by modulating the wavelength of laser diode using conventional techniques.

A unique crack opening displacement monitor has also been demonstrated using sensors according to the invention. The sensor is placed across the crack and attached to either side such that a widening of the crack causes the air gap within the sensor to widen. Such an application has particular use in a critical aircraft part, for example. The same principle can be used to monitor large displacements relative to the gage length, something not possible with prior art intrinsic optical fiber sensors, which are limited to the maximum allowable strains for optical fibers (3-4% strain).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
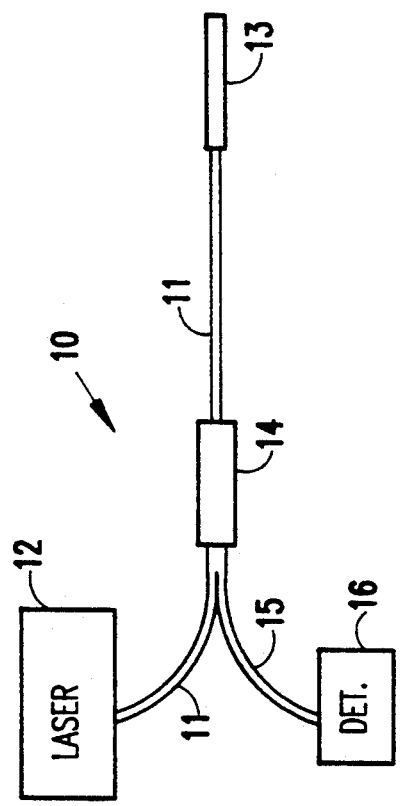
FIG. 1 is a schematic block diagram showing the principle components of the extrinsic Fizeau sensor according to the invention.

Referring now to the drawings, and more particularly to FIG. 1, there is shown a schematic block diagram of the principle components of the extrinsic Fizeau sensor 10 according to the invention. A single mode fiber 11 ($\lambda_0=1300$ nm) is used as the input-output fiber. The fiber 11 conducts light from a laser source 12 to the Fizeau sensor 13 and reflected light back to a fused biconical tapered coupler 14. The reflected light is coupled in coupler 14 to a single mode fiber 15 to a detector 16.

Figure 2:
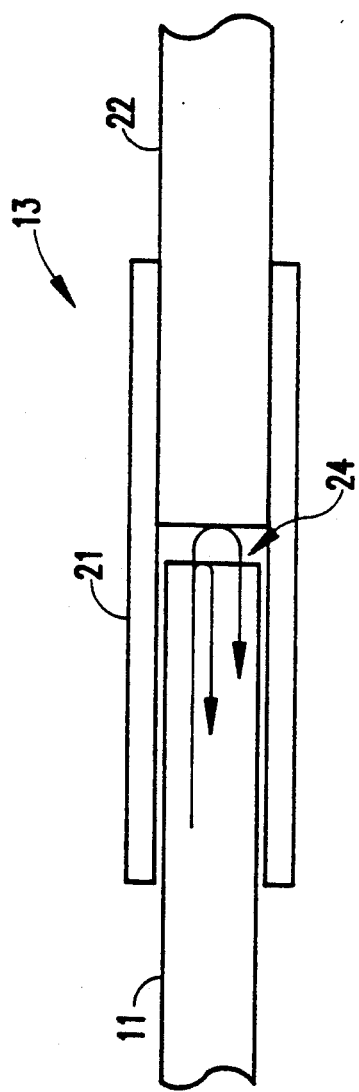
FIG. 2 is a cross-sectional view showing details of the construction of the Fizeau sensor.

FIG. 2 shows in more detail the construction of the Fizeau sensor 13 which comprises a hollow-core silica fiber 21 into one end of which the single mode fiber 11 is inserted. From the opposing end of the hollow-core silica fiber 21, a multimode fiber 22 is inserted. The multimode fiber 22 is used purely as a reflector, the far end of the multimode fiber being shattered so the reflection from the far end does not add to the detector noise. The space 24 between the end of the single mode fiber 11 and the end of the multimode fiber 22 forms an air gap that acts as a Fizeau cavity.

The Fresnel reflection from the glass-air interface at the front of the air gap (reference reflection) and the reflection from the air-glass interface at the far end of the air gap (sensing reflection) interfere in the input-output fiber 11. Although multiple reflections occur within the air gap, the effect of reflections subsequent to the ones mentioned above can be shown to be negligible. The two fibers 11 and 22 are allowed to move in the silica tube 21, and changes in the air gap length cause changes in the phase difference between the reference reflections and the sensing reflection, thus changing the intensity of the light monitored at the output arm of the coupler 14.

Figure 3:
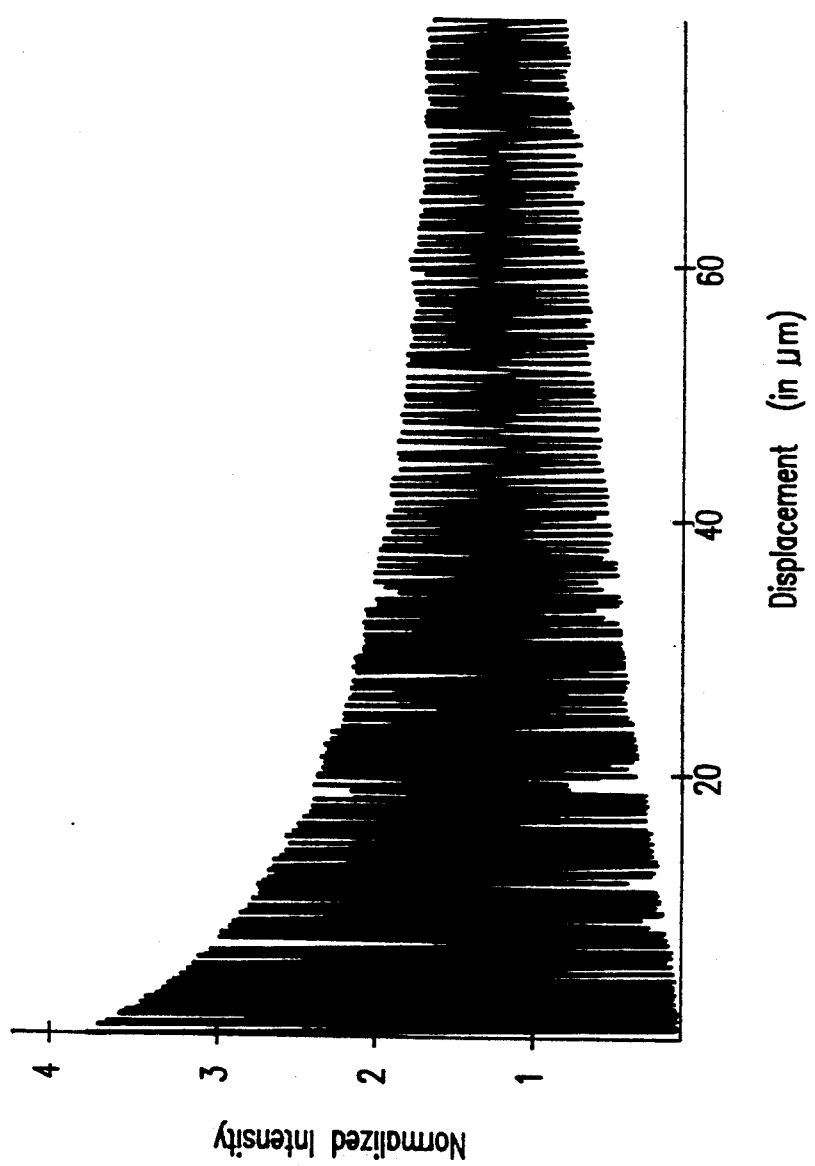
FIG. 3 is a graph showing the variation of output intensity with increasing gap displacement of the sensor shown in FIG. 2.

The interference of the two-wave interferometer is evaluated in terms of a plane-wave approximation. A coherent, approximately plane wave detected at the output of the sensor can be represented in terms of its complex amplitude $U_i(x,z,t)$, given by $$U_i(x,z,t) = A_i \exp\{j\phi_i\}, \quad i = 1,2, \tag{1}$$

where the variable $A_i$ can be a function of the transverse coördinate x and the distance traveled z and the subscripts $i = 1,2$ stand for the reference and the sensing reflections, respectively. Assuming that the reference reflection coëfficient $A_1 = A$, the sensing reflection coëfficient $A_2$ can be approximated by the simplified relation $$A_2 = A\left(\frac{ta}{a + 2s\tan[\sin^{-1}(NA)]}\right), \tag{2}$$

where a is the fiber core radius, t is the transmission coëfficient of the air-glass interface ($\approx 0.98$), s is the end separation, and NA is the numerical aperture of the sing mode fiber 11, given by $NA = (n_1^2 - n_2^2)^{\frac{1}{2}}$. $n_1$ and $n_2$ are the refractive indices of the core and the cladding, respectively. Equation (2) is described by G. Keiser in *Optical Fiber Communications*, McGraw-Hill (1983), at page 134. The observed $$I_{det} = |U_1 + U_2|^2 = A_1^2 + A_2^2 + 2A_1A_2 \cos(\phi_1 - \phi_2), \tag{3a}$$

which can be rewritten as $$I_{det} = A^2\left(1 + \frac{2ta}{a + 2s\tan[\sin^{-1}(NA)]} \times \cos\left(\frac{4\pi s}{\lambda}\right) + \left(\frac{ta}{a + 2s\tan[\sin^{-1}(NA)]}\right)^2\right), \tag{3b}$$

where it is assumed that $\phi_1 = 0$ and $\phi_2 = 2s(2\pi/\lambda)$ and $\lambda$ is the wavelength of operation in free space. The simplified loss relation expressed in Equation (2) for the misalignment of two fibers is sufficient for understanding the drop in the output intensity of the sensor as a function of the gap displacement. For a strain sensor, it is useful to plot the detected intensity versus gap separation s, as shown in FIG. 3. FIG. 3 shows that the fringe contrast drops as the displacement increases. This is to be expected since the relative intensity of the sensing reflection starts dropping with respect to the reference reflection.

Figure 4:
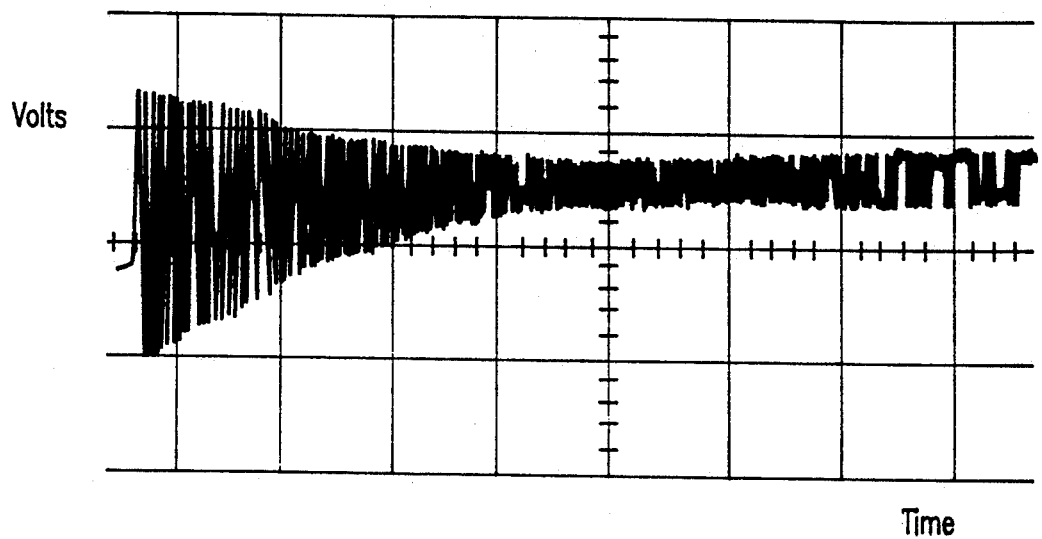
FIG. 4 is a graph showing an oscilloscope trace of observed fringes for increasing gap displacement.

The extrinsic Fizeau interferometer has been tested as a displacement sensor by attaching one fiber, the single mode fiber 11, to a stationary block and the second fiber, the multimode fiber 22, to a micropositioner which produces a known displacement between the fiber ends. FIG. 4 is an oscilloscope trace of the continuously monitored output intensity of the sensor for $s = 0$ to $s = 203$ μm and shows the experimentally counted number of fringes for the displacement to be 310.5, which corresponds to a theoretically calculated displacement of 202 μm.

Figure 5:
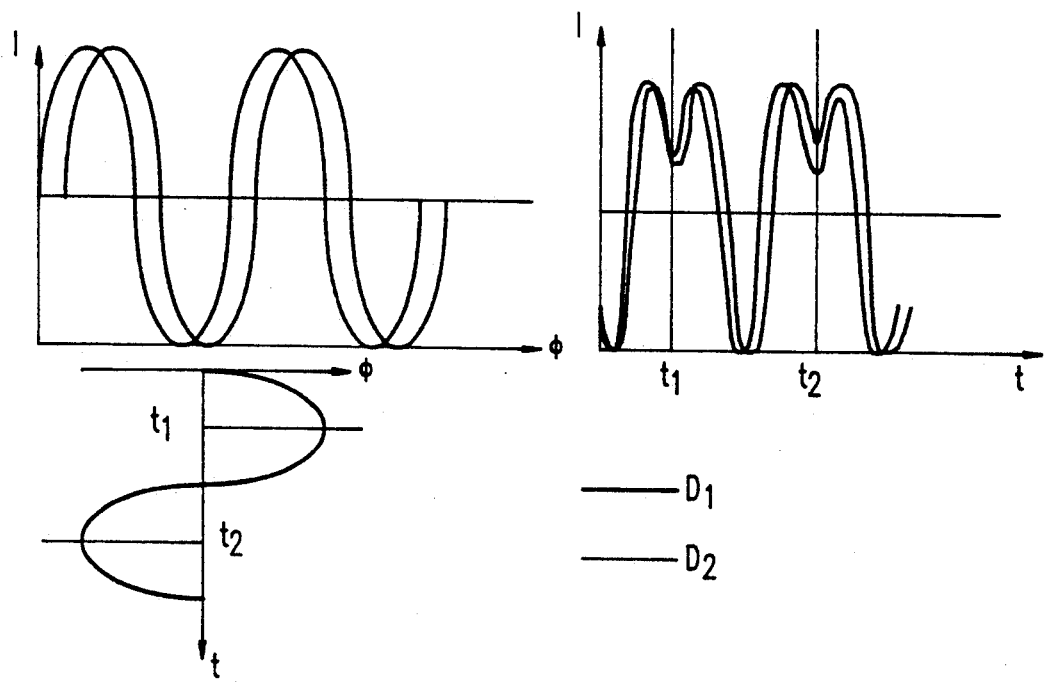
FIG. 5 is a graph showing transfer functions illustrating the principle of operation of the quadrature phase-shifted sensors according to the invention.

FIG. 5 is a graph showing a typical sinusoidal variation of the output intensity with respect to changes in the phase difference between the reference and the sensing reflections. If the phase difference $\phi$ varies sinusoidally with time and the peak-to-peak variation is large enough to push the sensor out of its linear range, fringes are observed at the output of the detector, as indicated by FIG. 4. The basic principle of operation of the detection scheme for a dynamic strain measurement system can now be described by considering two sinusoidal transfer functions out of phase by 90°. Assuming that the transfer function for the first detector ($D_1$) leads that of the second detector ($D_2$), the output waveform for $D_1$ leads that of $D_2$ until time $t_1$. At time $t_1$, the phase $\phi$ changes direction because of a change in direction of the strain, and the output waveforms switch their lead-lag properties. The output from $D_2$ now leads that of $D_1$ until time $t_2$, when the strain changes direction again. Keeping track of the lead-lag phenomenon between the two detectors provides unambiguous information about the relative direction of the strain.

If only one detector is used, the switch in direction would not be noticeable if the strain changes direction at a peak of the transfer function curve. With two signals out of phase by 90°, if the direction change occurs at one peak (of either $D_1$ or $D_2$), the other transfer function curve will provide information about the direction change.

Figure 6:
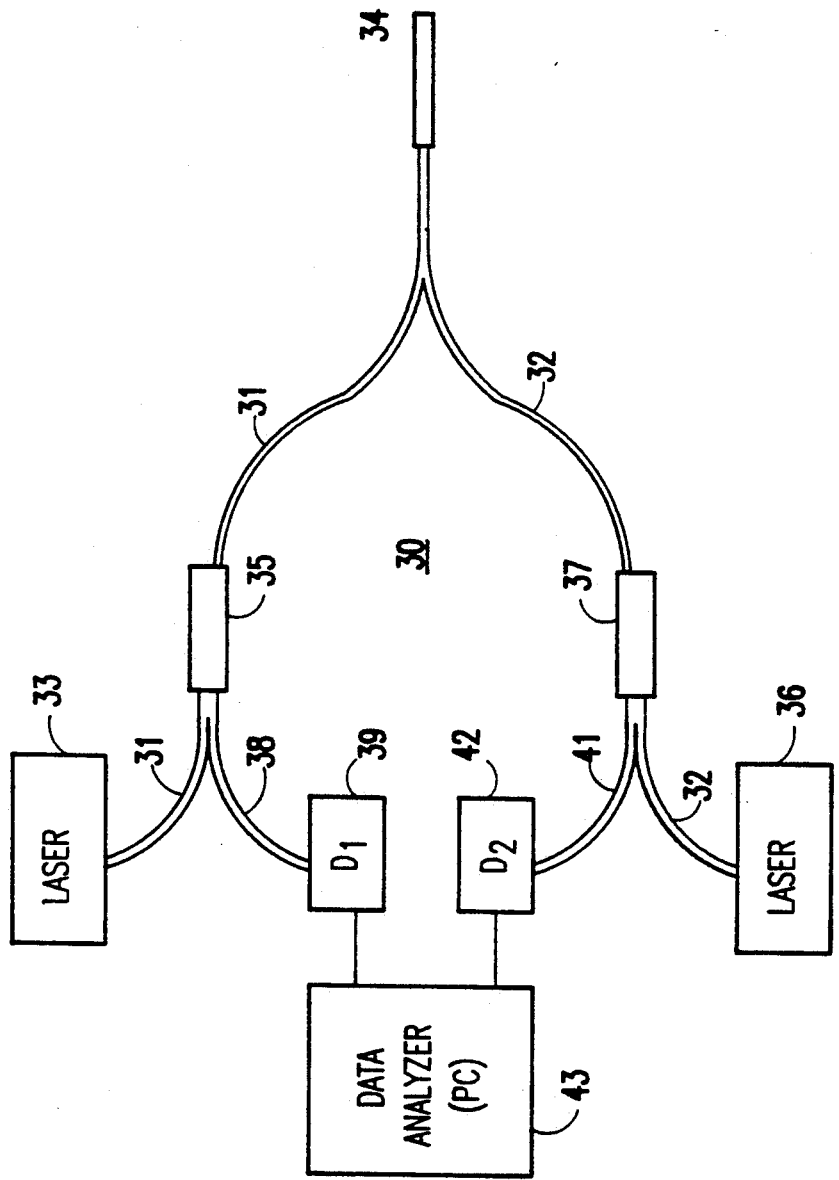
FIG. 6 is a schematic block diagram showing an arrangement for obtaining two signals 90° out of phase with one another.
Figure 7:
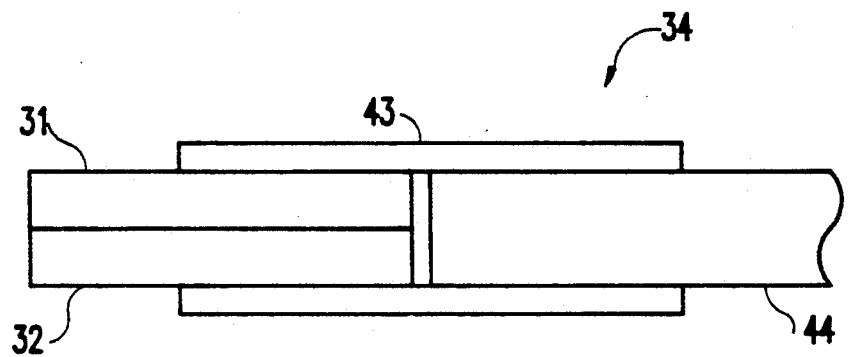
FIG. 7 is a cross-sectional view showing details of the construction of the Fizeau sensor used in FIG. 6.
Figure 8:
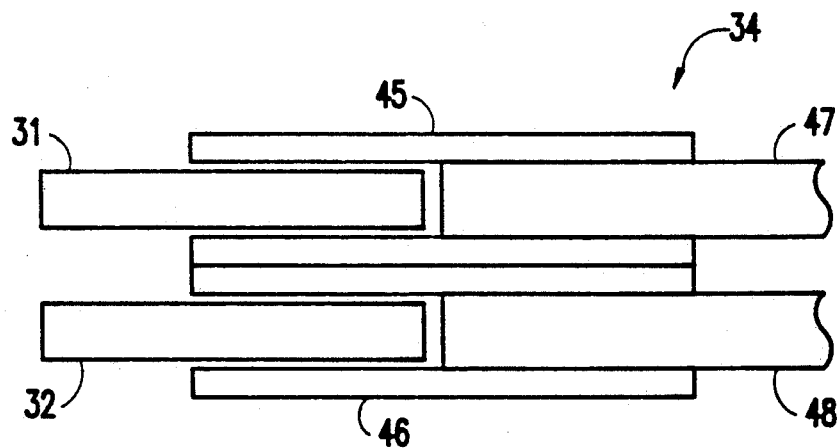
FIG. 8 is a cross-sectional view showing details of the construction of a variation of the sensor shown in FIG. 7.

Practical methods of obtaining two signals 90° out of phase with respect to one another are shown in FIGS. 6, 7 and 8. FIG. 6 shows the basic components as comprising the extrinsic Fizeau sensor shown in FIG. 1 and a replication of light source, detector, coupler, and single mode optic fiber. More particularly, the quadrature phase-shifted, extrinsic Fizeau sensor 30 according to one embodiment of the invention comprises first and second single mode fibers 31 and 32 used as input-output fibers. The fiber 31 conducts light from a laser source 33 to the Fizeau sensor 34 and reflected light back to a fused biconical tapered coupler 35. Similarly, the fiber 32 conducts light from a laser source 36 and reflected light back to a fused biconical tapered coupler 37. The reflected light coupled in coupler 36 is conducted by a single mode fiber 38 to a detector 39 ($D_1$), and the reflected light coupled in coupler 37 is conducted by a single mode fiber 41 to a detector 42 ($D_2$). The outputs of detectors 39 and 42 are supplied to a data analyzer 43, which may be implemented with a personal computer (PC) programmed to track the phase reversals and provide a measure of the polarity of the sensed strain as well as the magnitude of the strain.

In FIG. 7, the two single-mode fibers 31 and 32 are inserted into one end of a single hollow silica tube 43. A multimode optic fiber 44, similar to multimode fiber 22 in FIG. 2, is inserted in the opposite end of hollow silica tube 43. The gap-separations for the two fibers 31 and 32 versus the fiber 44 are adjusted actively by moving the fibers 31 and 32 in and out of the tube 43 until a 90° phase shift is achieved at the output detectors 39 and 42.

FIG. 8 shows as system using two different silica tubes 45 and 46 and two different multimode fibers 47 and 48, the two multimode fibers 47 and 48 being movable in unison. In this construction, the quadrature phase shift is also adjusted actively. Since the two tubes have external diameters on the order of a few hundred micrometers, the two sensors monitor almost the same environmental perturbations.

In FIG. 6, two different sources are used in order to avoid interference effects between the two signals returning to the coupler if only one source was used to launch light into the single-mode fibers. It is also possible to use a single source and two different lengths of lead fibers for the two sensors such that the difference in the lengths is greater than the coherence length of the laser.

Figure 9:
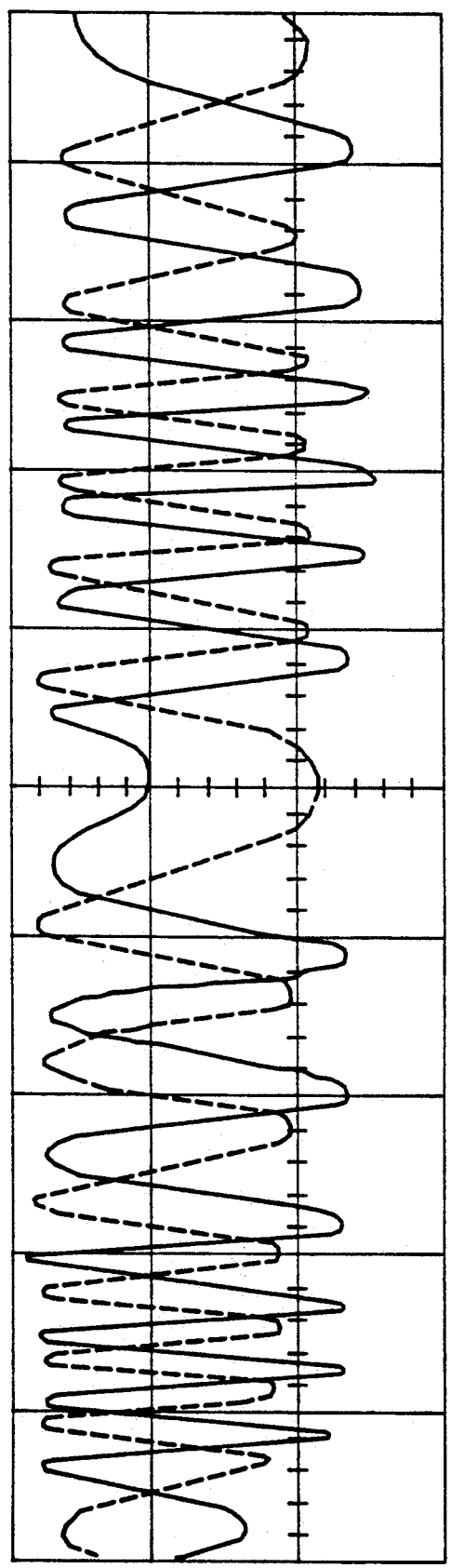
FIG. 9 is a graph of an oscilloscope trace of quadrature phase-shifted sensors showing lead-lag phenomenon.

To test the validity of the quadrature phase-shifted sensors, the sensor was attached, using the scheme shown in FIGS. 6 and 7, to a cantilever titanium beam with an epoxy. The fiber sensor was attached along the length of the beam and beam vibrations were monitored. A typical oscilloscope trace is shown in FIG. 9 which clearly shows the shift in the lead/lag properties of the two signals as the relative direction of the strain in the beam changes form increasing to decreasing. Sensitivities of 5.54° phase shift/microstrain-cm have been obtained.

Thus, the simple, extrinsic Fizeau sensor according to the invention can be operated in a quadrature phase-shifted mode to obtain dynamically varying strain information. Limitations of the frequency range of operation will be set by the signal processing electronics at the output. The signal-to-noise ratio of the sensor decreases if a large air gap is introduced since the fringe contrast starts to drop. Hence, the sensor according to the invention will be useful for applications in which maximum displacements to be measured are of the order of a few hundred micrometers. Minimum displacements of 5 nm have been detected in a laboratory environment.

Figure 10:
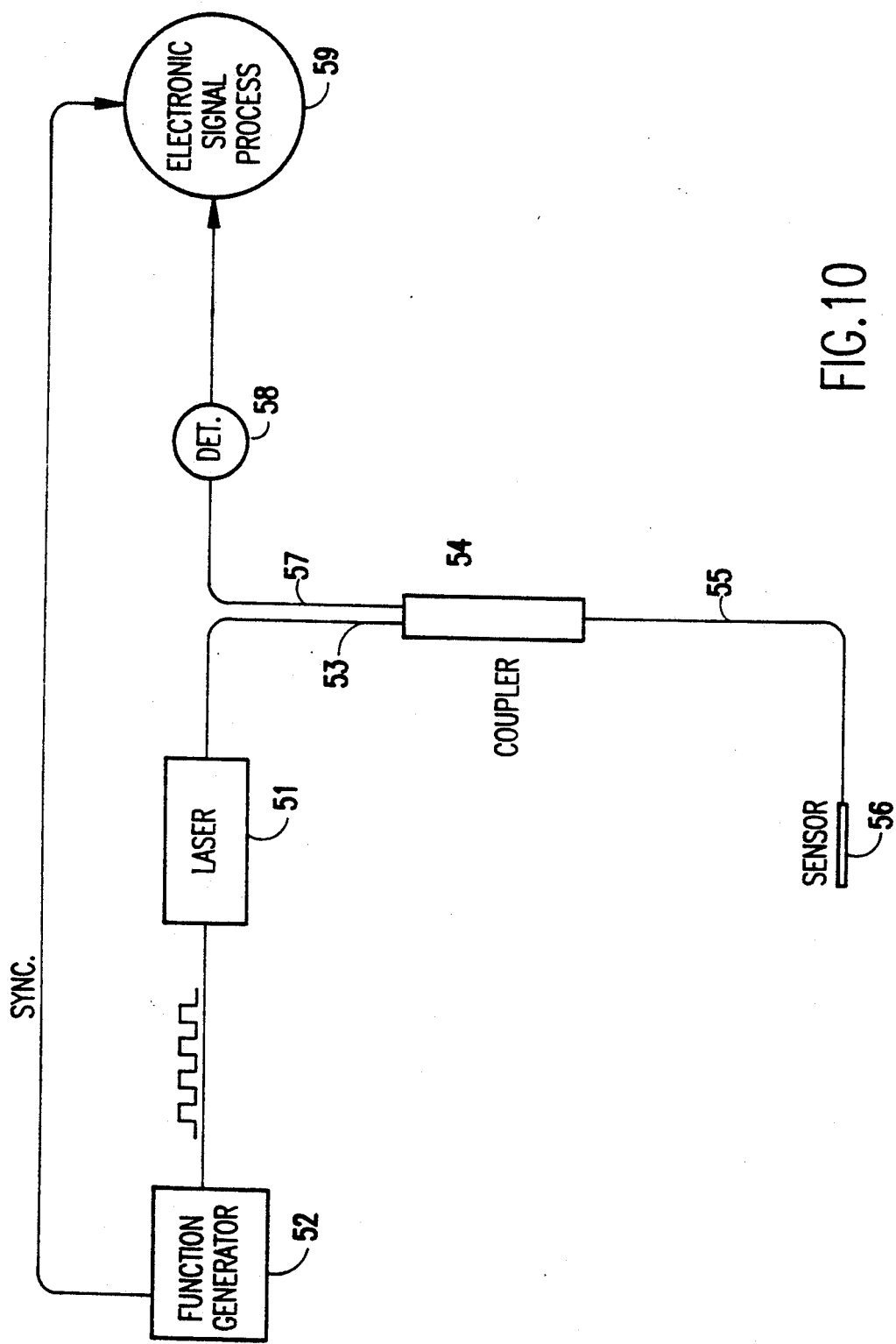
FIG. 10 is a block diagram showing a variation of the quadrature phase shift sensor of FIG. 6 using but one laser light source.

FIG. 10 shows a modification of the quadrature phase shift sensor shown in FIG. 6 wherein a single laser light source is used instead of the two shown in that figure. With reference to FIG. 10, the single diode laser 51 is modulated by two current levels output by a function generator 52 to provide light at two wavelengths, $\lambda_1$ and $\lambda_2$. These wavelengths are sufficiently close that a range within the beat length of the two light signals can be chosen that, within the small range of the gage length, approximate phase quadrature signals. The light from the laser 51 is coupled via a single mode optical fiber 53 to a coupler 54. The coupler 54 passes this light to a single mode optical input/output fiber 55 to the sensor 56. The sensor 56 is constructed as shown in FIG. 2. The reflected light from sensor 56 is passed via input/output fiber 55 back to the coupler 54 which, in turn, couples the reflected light via single mode optical fiber 56 to a detector 57. Detector 57 generates an electrical output signal which is supplied to an electronic signal processor 58. The electrical signal from the detector carries information which reflects the pulsed modulation of the laser diode. Therefore, the electronic signal processor 58 is synchronized to the function generator 52 to sample the detector signal at points intermediate the leading and trailing edges of the pulsed output from function generator 52.

Figure 11:
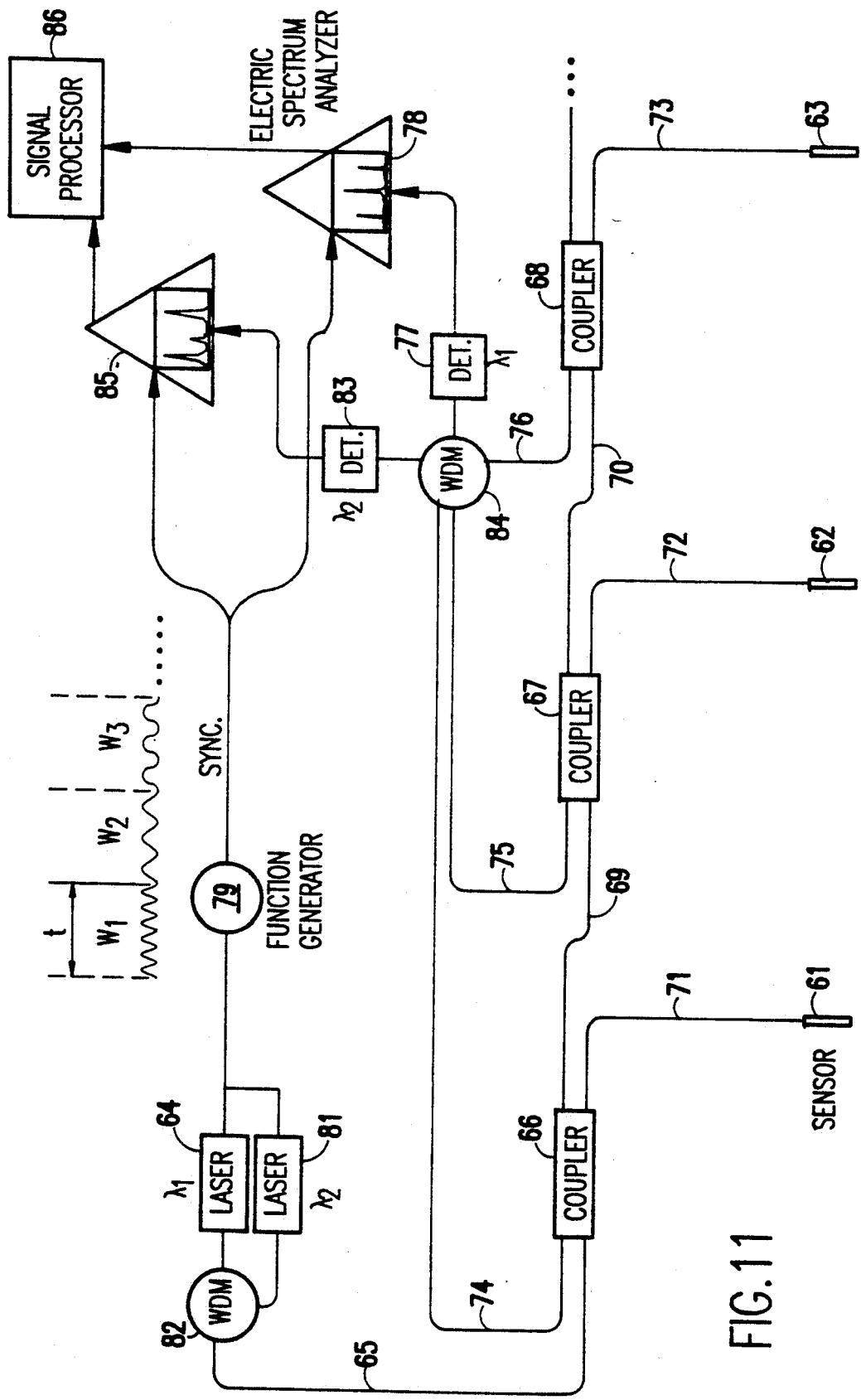
FIG. 11 is a block diagram showing a system for multiplexing a plurality of extrinsic sensors according to the invention.

FIG. 11 shows another modification to the basic invention which allows multiplexing a plurality of extrinsic Fizeau fiber optic sensors of the type shown in FIGS. 1 and 2. For purposes of illustration, there are three such sensors 61, 62 and 63 shown, but the principle may be applied to an unlimited number of sensors depending only on the specific application. Light is supplied from a laser 64 via a single mode optical fiber 65 to the first of a plurality of cascaded couplers 66, 67 and 68, each of which is coupled to the next preceding coupler via a single mode optical fiber 69, 70 and so forth. Each coupler supplies light to a respective one of the sensors 61, 62 and 63 via corresponding single mode optic input/output fibers 71, 72 and 73. The reflected light from sensors 61, 62 and 63 is coupled via respective optical fibers 71, 72 and 73 back to corresponding couplers 66, 67 and 68 and thence, via respective single mode optical fibers 74, 75 and 76, to a common detector 77. The electrical output of the common detector 77 is coupled to an electrical spectrum analyzer 78.

The laser 64 is modulated by a stepped function generator 79 which provides a synchronizing signal to electrical spectrum analyzer 78. The modulating frequencies, $\omega_1$, $\omega_2$ and $\omega_3$, sequentially modulate the light output of laser 64. While each of the sensors 61, 62 and 63 respond to laser light modulated by each of these frequencies, the electrical spectrum analyzer displays only the response from sensor 61 for the modulating frequency $\omega_1$, the response from sensor 62 for the modulating frequency $\omega_2$ and the response from sensor 63 for the modulating frequency $\omega_3$. This is accomplished by providing suitable delays in the signals from couplers 66, 67 and 68 to the detector 77 so that the spectrum analyzer 78, triggered by the synchronizing signal from function generator 79, responds to only those sensor responses. The delays are provided by choosing lengths of optic fibers 74, 75 and 76 so that the desired responses arrive simultaneously at the detector 77. The resulting electrical signal is itself modulated, and it is the frequencies of this modulation which are detected and displayed by the spectrum analyzer 78. The amplitudes of the respective frequency peaks provide a measure of strain sensed by each of the sensors 61, 62 and 63.

A variation of the system shown in FIG. 11 provides for quadrature phase techniques as described above are applied so that the polarities of the strains sensed by each of the sensors may be monitored. More particularly, two lasers 64 and 81, having wavelengths of $\lambda_1$ and $\lambda_2$, respectively, are controlled by the function generator 79. Thus, each of the two light wavelengths $\lambda_1$ and $\lambda_2$ are modulated by the modulating frequencies $\omega_1$, $\omega_2$ and $\omega_3$. The modulated light outputs of the lasers 64 and 81 are combined in a wavelength division multiplexer 82 and output onto the optic fiber 65. In addition, two detectors 77 and 83, tuned to wavelengths of $\lambda_1$ and $\lambda_2$, respectively, are coupled via a second wavelength division multiplexer 84 to each of optical fibers 74, 75 and 76. The output of detector 83 is connected to a second electrical spectrum analyzer 85. The desired linearized electrical output proportional to strain can be obtained by supplying a signal processor 86 with the two electrical spectrum analyzer outputs. The signal processor tracks the lead-lag phenomena shown in FIG. 9, thereby providing a measure of polarity of the sensed strain.

Figure 12:
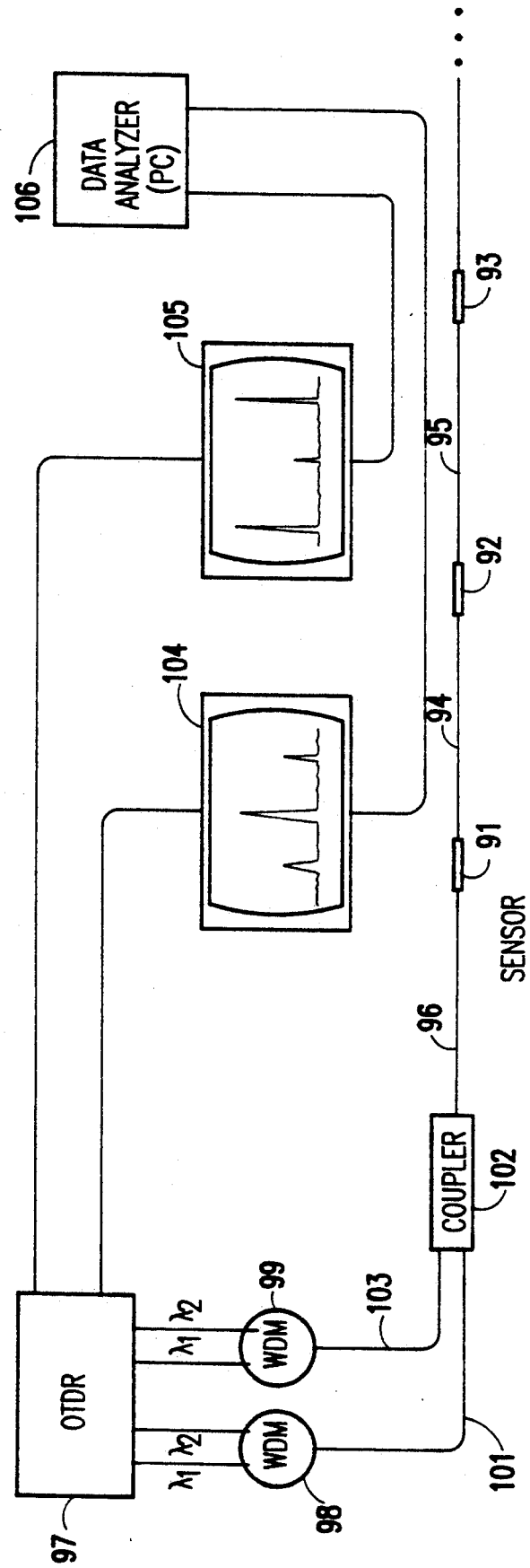
FIG. 12 is a block diagram showing a system for cascading a plurality of sensors which requires a modification of the structure shown in FIG. 2.

Another system which uses the extrinsic Fizeau interferometer fiber optic sensors according to the invention is shown in FIG. 12. Whereas the sensors in the system of FIG. 11 were connected to couplers which were connected in cascade, the sensors 91, 92 and 93 are themselves connected in cascade. This is accomplished by a simple modification of the sensor structure shown in FIG. 2 wherein the multimode fiber 22 is replaced by a single mode fiber which acts as the input/output optical fiber for the next succeeding sensor in the cascaded string. Thus, for example, sensor 91 is connected to sensor 92 via a single mode input/output optical fiber 94, sensor 92 is connected to sensor 93 via a single mode input/output optic fiber 95, and so forth. The entire string is connected to a single mode optical fiber 96 which, in effect, acts as the input/output fiber for the string.

The system shown in FIG. 12 contemplates the quadrature phase shift principles described above for measuring polarity as well as relative amplitude of strain sensed by the sensors; however, it will be understood by those skilled in the art that this technique of connecting sensors in cascade does not depend on quadrature phase sensing. That is, this technique could be applied to a sensing and monitoring system in which the polarities of the sensed strains is not important. In the system illustrated in FIG. 12, an optical time division reflectometer 97 provides light of two wavelengths, $\lambda_1$ and $\lambda_2$, to a wavelength division multiplexer 98. The output of multiplexer 98 is coupled via single mode optic fiber 101 to coupler 102, and the output of coupler 102 is coupled to the input/output optical fiber 96. The light received by coupler 102 from input/output optical fiber 96 is in turn coupled via single mode optical fiber 103 to a second wavelength division multiplexer 99. The output of multiplexer 99 is divided into the two wavelengths $\lambda_1$ and $\lambda_2$ and input to the reflectometer 97. The reflectometer 97 generates two electrical signals, corresponding to the received wavelengths $\lambda_1$ and $\lambda_2$, and these electrical signals are connected to respective digital oscilloscopes 104 and 105. The optical pulse from the optical time division reflectometer is on the order of 50 pico seconds in width and is repeated at a Khz rate. Fibers 94, 95 and 96 must be long enough relative to the pulse width such that the returned reflections from each sensor are distinguishable and are not overlapped in time. The intensity of the reflected signal is an indication of the interference between the reference and sensing signals of each sensor. The oscilloscope displays the reflected intensity of the individual sensors in time.

Optionally, the outputs of the digital oscilloscopes 104 and 105 are connected to a data analyzer 106, which may be implemented with a personal computer (PC) programmed to analyze the digital data outputs from the oscilloscopes. More specifically, the data analyzer will monitor the relative changes in intensity of the individual peaks reflected in time from each of the multiplexed sensors to allow the detection of strain and its polarity.

Figure 13:
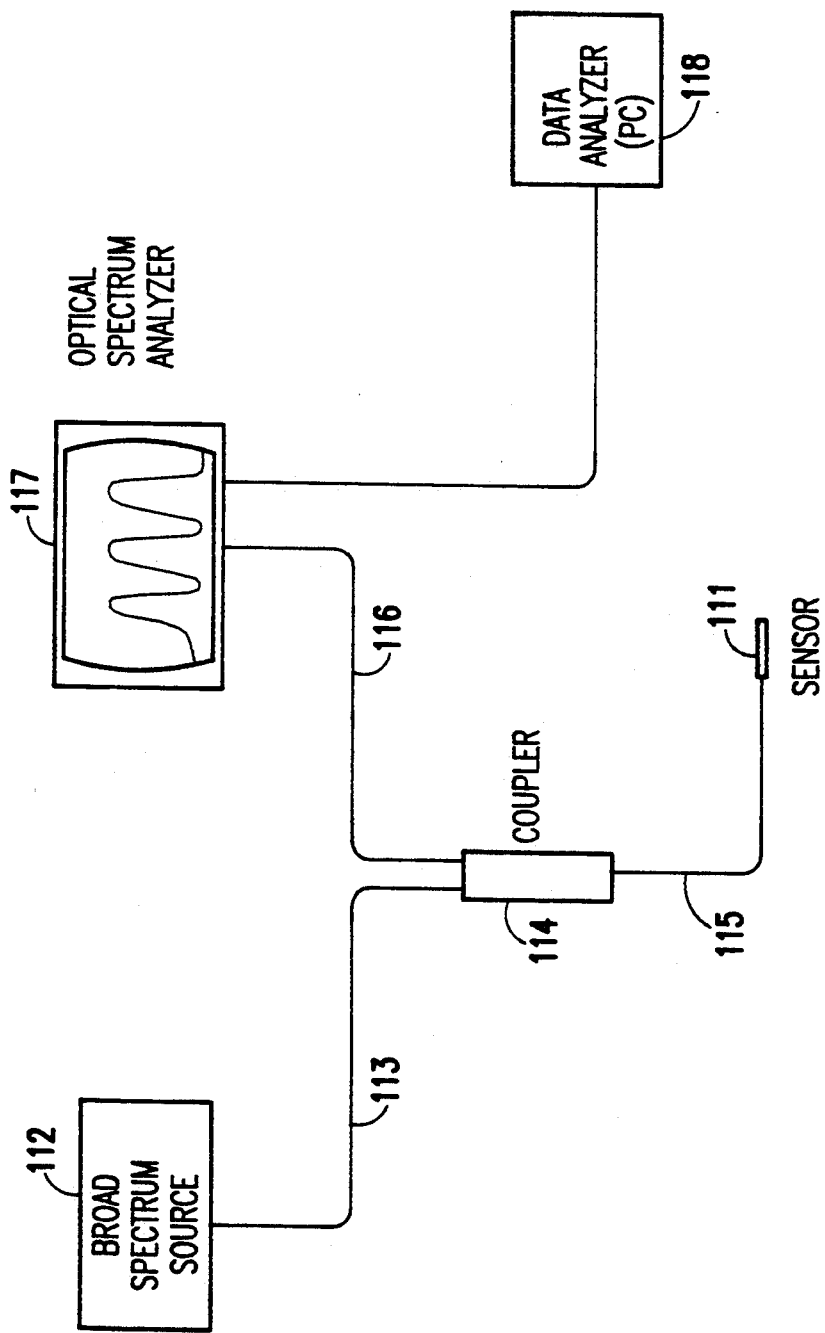
FIG. 13 is a block diagram showing a first system for making an absolute measurement of strain.

The systems thus far described measure relative strain. It is also possible to measure absolute strain using the extrinsic Fizeau fiber optic sensors according to the invention. FIG. 13 shows a first approach which comprises a sensor 111 of the type shown in FIG. 2. Light from a broad spectrum source 112, such as a light emitting diode or with white light, such as from a tungsten bulb, is coupled via a single mode optic fiber 113 to a coupler 114 and thence, via an input/output single mode optical fiber 115, to the sensor 111. The reflected light from the sensor 111 is coupled via coupler 114 and single mode optical fiber 116 to an optical spectrum analyzer 117. The output of the optical spectrum analyzer 117 is a display of optical peaks which represent wavelengths of constructive interference caused by a unique air gap displacement of the extrinsic Fizeau interferometer sensor according to the invention. A data analyzer 118 is used to process the signal from the optical spectrum analyzer into the desired form or display.

Figure 14:
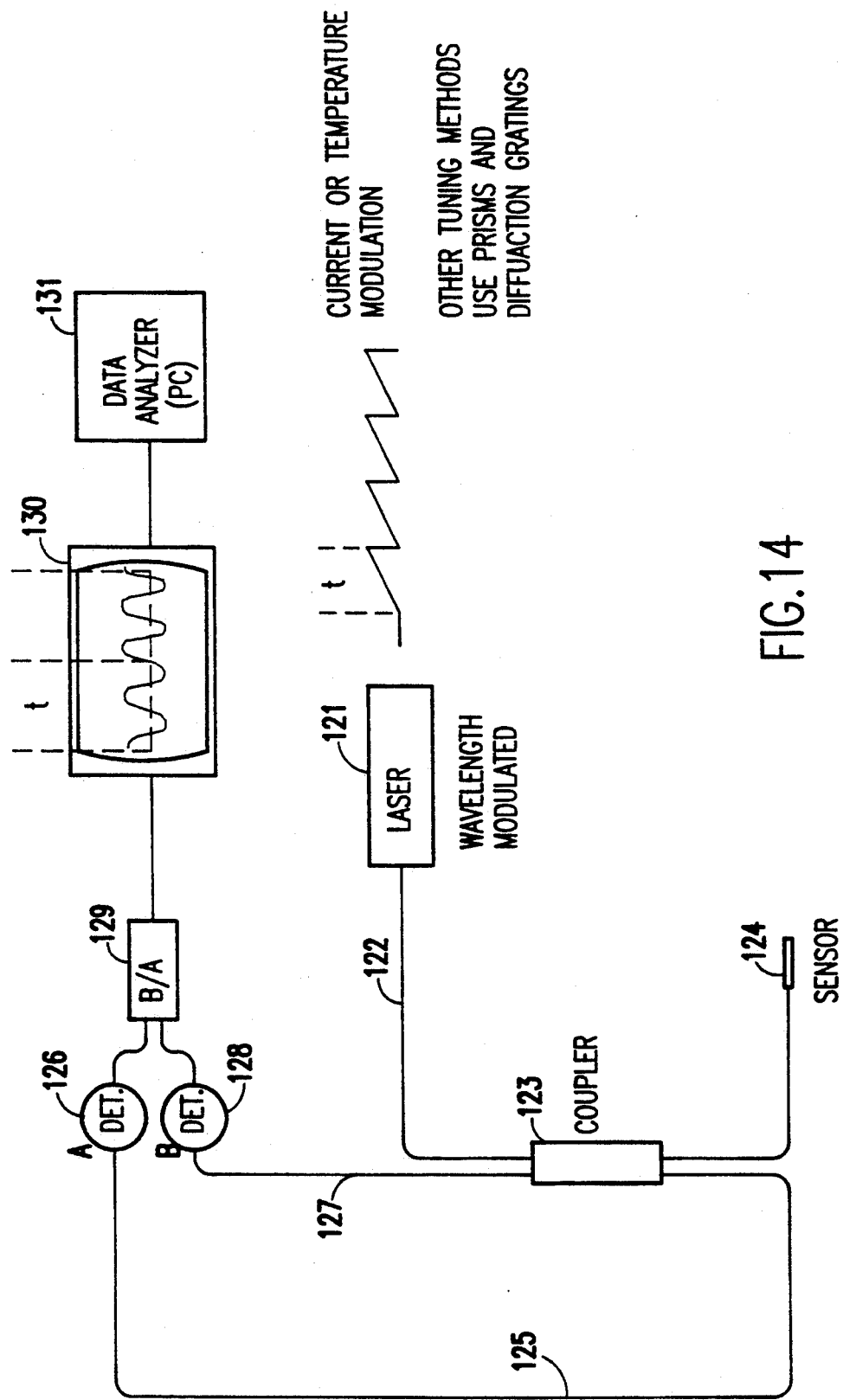
FIG. 14 is a block diagram showing a second system for making an absolute measurement of strain.

Another system for measuring absolute strain is shown in FIG. 14 wherein a laser 121 is modulated by a sawtooth waveform so that the frequency of the laser light increases linearly over a time period, t. The thus modulated light from laser 121 is coupled via single mode optic fiber 122 to a coupler 123 and thence, via a single mode input/output optic fiber to a sensor 124. The sensor 124 is of the type shown in FIG. 2. The modulated light from the laser is also coupled via coupler 123 and a single mode optic fiber 125 to a first, or reference, detector 126. The reflected light from sensor 124 is, in turn, coupled via coupler 123 and a single mode optic fiber 127 to a second detector 128. The electrical signals from the two detectors 126 and 128 are divided in analog divider 129 to generate a quotient signal which is supplied to an electrical spectrum analyzer 130. The output of the electrical spectrum analyzer 130 can be supplied to a data analyzer 131, said as a personal computer (PC), to manipulate the data into the desired form.

While the invention has been described in terms of a single preferred embodiment with variations in construction, those skilled in the art will recognize that the invention can be practiced with modification within the spirit and scope of the appended claims.

Having thus described our invention, what we claim as new and desire to secure by Letters Patent is as follows:

1. An extrinsic fiber optic sensor for the detection of the amplitude of dynamically varying displacement comprising:

an optical fiber inserted into one end of a hollow silica tube;

a reflector inserted in an opposite end of said hollow silica tube, an end of said optical fiber and said reflector within said at least one hollow silica tube forming an air gap, said optical fiber being axially displaced relative to said reflector by a dynamically varying displacement and said air gap varying in axial length due to the relative displacement of said optical fiber;

a light source supplying light to said optical fiber, said optical fiber being used as an input/output fiber, a Fresnel reflection from a glass/air interface at a front of said air gap serving as a reference reflection and a reflection from an air/glass interface at a far end of each air gap serving as a sensing reflection, said reference and sensing reflections interfering in said optical fiber; and coupler means connected to said optical fiber for coupling reflections to a detector, changes in said air gap length causing changes in phase differences between said reference reflection and sensing reflection and changes the intensity of light monitored by said detector.

2. The extrinsic fiber optic sensor recited in claim 1 wherein said reflector is a second optical fiber inserted in an opposite end of said hollow silica tube.

3. The extrinsic fiber optic sensor recited in claim 2 wherein said second optical fiber is used purely as a reflector.

4. The extrinsic fiber optic sensor recited in claim 2 wherein said second optical fiber is connected to a second extrinsic fiber optic sensor as an input/output optical fiber.

5. A quadrature phase-shifted extrinsic fiber optic sensor for the detection of the amplitude and the relative polarity of dynamically varying displacement comprising:
   first and second optical fibers inserted into one end of at least one hollow silica tube;
   a reflector, ends of said first and second optical fibers and said reflector within said at least one hollow silica tube forming first and second air gaps that act as cavities;
   a light source supplying light to said first and second optical fibers, said first and second optical fibers being used as input/output fibers, a Fresnel reflection from a glass/air interface at a front of each air gap serving as reference reflections and a reflection from an air/glass interface at a far end of each air gap serving as sensing reflections, said reference and sensing reflections interfering in the first and second fibers;
   first and second coupler means respectively connected to said first and second optical fibers for coupling reflections to respective first and second detectors, changes in said first and second air gap lengths causing changes in phase differences between respective reference reflections and sensing reflections and changes intensities of the light respectively monitored by said first and second detectors, gap separations for said first and second optical fibers being initially adjusted by moving the optical fibers in and out of said at least one silica tube until a 90° phase shift is achieved at outputs of said first and second detectors; and
   means connected to said first and second detectors for monitoring both amplitude and relative polarity of dynamically varying strain by measuring amplitudes of signals from said first and second detectors and tracking lead-lag reversals of said signals.

6. The quadrature phase-shifted extrinsic fiber optic sensor recited in claim 5 further comprising a second hollow silica tube and a second reflector, said second optical fiber being inserted into one end of said second hollow silica tube and said second reflector being inserted in an opposite end of said second hollow silica tube, an end of said second optical fiber and said second reflector within said second hollow silica tube forming said second air gap.

7. The quadrature phase-shifted extrinsic fiber optic sensor recited in claim 5 wherein said light source comprises first and second laser devices respectively coupled to said first and second optical fibers.

8. A system for sensing displacements at a plurality of locations in a mechanical structure comprising:
   a plurality of extrinsic fiber optic sensors mounted or embedded in said mechanical structure for the detection of the amplitude of dynamically varying displacement, each said plurality of extrinsic fiber optic sensors comprising:
      an optical fiber inserted into one end of a hollow silica tube;
      a reflector inserted in an opposite end of said hollow silica tube, and end of said optical fiber and said reflector within said at least one hollow silica tube forming an air gap, said optical fiber being axially displaced relative to said reflector by a dynamically varying displacement and said air gap varying in axial length due to the relative displacement of said optical fiber, said optical fiber being used as an input/output fiber, a Fresnel reflection from a glass/air interface at a front of said air gap serving as a reference reflection and a reflection from an air/glass interface at a far end of each air gap serving as a sensing reflection, said reference and sensing reflections interfering in said optical fiber;
   means for coupling said plurality of extrinsic fiber optic sensors in cascade;
   multiplexing means for addressing and sensing an output of each of said plurality of extrinsic fiber optic sensors;
   a light source controlled by said multiplexing means for supplying light to said optical fiber of each of said plurality of extrinsic optical sensors; and
   coupler means connected to said optical fiber for coupling reflections to a detector, changes in said air gap length of a sensor causing changes in phase differences between said reference reflection and sensing reflection and changes the intensity of light monitored by said detector, said detector providing an output to said multiplexing means.

9. The system for sensing displacements at a plurality of locations in a mechanical structure recited in claim 8 wherein said multiplexing means comprises:
   function generator means for sequentially modulating said laser means with a plurality of modulating signals of different frequencies, each of said different frequencies addressing a different sensor; and
   analyzer means synchronized to said function generator means for analyzing reflected light intensities from each of said sensors as detected by said detector.

10. The system for sensing displacements at a plurality of locations in a mechanical structure recited in claim 8 wherein said coupler means comprises a plurality of couplers, one for each of said sensors, and said means for connecting said sensors in cascade comprises a plurality of optical fibers connecting said plurality of couplers in cascade, each of said couplers being connected to said detector by an optical fiber.

11. The system for sensing strain at a plurality of locations in a mechanical structure recited in claim 8 wherein said light source comprises two laser sources having different wavelength light outputs, said wavelengths being chosen to approximate within a beat length of said wavelengths two quadrature signals, said system further comprising:
   light combining means for coupling the light outputs from said two laser sources to said optical fiber of each of said plurality of extrinsic optical sensors;
   light splitting means for dividing light of said different wavelengths from said coupler means;
   said detector including first and second tuned detector means for providing outputs corresponding to respective ones of said different wavelengths; and
   signal processor means responsive to outputs of said first and second tuned detector means for monitoring amplitudes and phase reversals of said outputs to provide an indication of both polarities and intensities of strains sensed by each of said sensors.

12. The system for sensing displacements recited in claim 8 wherein said reflector of each extrinsic fiber optic sensor is a second optical fiber inserted in an opposite end of said hollow silica tube.

13. The system for sensing displacements at a plurality of locations in a mechanical structure recited in claim 12 wherein said second optical fiber of each of said sensors is a single mode optical fiber and said means for connecting said sensors in cascade comprises the second optical fiber of each sensor connected as an input/output optical fiber of a next succeeding sensor.

* * * * *